US007856565B2

(12) United States Patent  (10) Patent No.: US 7,856,565 B2
Igari  (45) Date of Patent: *Dec. 21, 2010

(54) ELECTRONIC DEVICE WITH SERIAL ATA INTERFACE AND POWER SAVING METHOD FOR SERIAL ATA BUSES

(75) Inventor: Fubito Igari, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/398,569

(22) Filed: Mar. 5, 2009

(65) Prior Publication Data

US 2009/0172447 A1 Jul. 2, 2009

Related U.S. Application Data

(62) Division of application No. 11/956,996, filed on Dec. 14, 2007, now Pat. No. 7,747,885, which is a division of application No. 10/931,949, filed on Sep. 1, 2004, now Pat. No. 7,328,356.

(30) Foreign Application Priority Data

Sep. 2, 2003 (JP) ............................. 2003-310361

(51) Int. Cl.
 G06F 1/00 (2006.01)
(52) U.S. Cl. ...................................... 713/310; 713/320
(58) Field of Classification Search ................. 713/300, 713/310, 320, 323, 324
 See application file for complete search history.

(56) References Cited

U.S. PATENT DOCUMENTS

| 5,442,608 | A | 8/1995 | Umeda et al. |
| 5,659,762 | A | 8/1997 | Sawada et al. |
| 5,691,948 | A | 11/1997 | Sakabe |
| 5,799,199 | A | 8/1998 | Ito et al. |
| 6,073,195 | A | 6/2000 | Okada |
| 6,608,729 | B1 | 8/2003 | Willems et al. |
| 6,725,385 | B1 | 4/2004 | Chu et al. |
| 6,845,420 | B2 | 1/2005 | Resnick |
| 6,854,045 | B2 | 2/2005 | Ooi et al. |
| 6,976,190 | B1 | 12/2005 | Goldstone |
| 7,010,711 | B2 | 3/2006 | Bashford et al. |

(Continued)

FOREIGN PATENT DOCUMENTS

JP 07-295672 A 11/1995

(Continued)

OTHER PUBLICATIONS

Serial ATA: High Speed Serialized AT Attachment, Revision 1.0a, Jan. 7, 2003, p. 117.

(Continued)

Primary Examiner—Chun Cao
(74) Attorney, Agent, or Firm—Foley & Lardner LLP

(57) ABSTRACT

In an electronic device with a serial ATA interface, upon detection of the issue or reception of a preset command, a confirmation device, such as a CPU, confirms the completion of execution of the command. Upon confirming the completion of execution of the command, a controller, which may also be the CPU, controls shifting of the serial ATA interface to a power saving mode.

11 Claims, 7 Drawing Sheets

U.S. PATENT DOCUMENTS

| | | |
|---|---|---|
| 7,020,834 B2 | 3/2006 | Chiang et al. |
| 7,028,199 B2 | 4/2006 | Ayyavu et al. |
| 7,069,456 B2 | 6/2006 | Bormann et al. |
| 7,133,956 B2 | 11/2006 | Handa et al. |
| 7,254,732 B2 | 8/2007 | Bashford et al. |
| 7,293,167 B2 | 11/2007 | Cho et al. |
| 7,328,356 B2 | 2/2008 | Igari |
| 7,330,989 B2 | 2/2008 | Bashford et al. |
| 2003/0005231 A1 | 1/2003 | Ooi et al. |
| 2003/0081743 A1 | 5/2003 | Chiang et al. |
| 2003/0135577 A1 | 7/2003 | Weber et al. |
| 2003/0158991 A1 | 8/2003 | Deyring et al. |
| 2004/0083324 A1 | 4/2004 | Rabinovitz et al. |
| 2004/0268170 A1 | 12/2004 | Ayyavu et al. |

FOREIGN PATENT DOCUMENTS

| | | |
|---|---|---|
| JP | 08-335357 A | 12/1996 |
| JP | 11-212687 A | 8/1999 |
| JP | 2001-135009 A | 5/2001 |
| JP | 2002-117616 A | 4/2002 |
| JP | 3095412 U | 5/2003 |
| JP | 2009-080855 A | 4/2009 |

OTHER PUBLICATIONS

Fubito Igari, U.S. PTO Office Action, U.S. Appl. No. 12/398,499, Dec. 30, 2009, 11 pages.

Fubito Igari, U.S. PTO Office Action, U.S. Appl. No. 11/956,996, filed Mar. 30, 2009, 14 pages.

U.S. Appl. No. 12/398,499, filed Mar. 5, 2009, Fubito Igari.
U.S. Appl. No. 12/398,513, filed Mar. 5, 2009, Fubito Igari.
U.S. Appl. No. 12/398,524, filed Mar. 5, 2009, Fubito Igari.
U.S. Appl. No. 12/398,530, filed Mar. 5, 2009, Fubito Igari.
U.S. Appl. No. 12/398,544, filed Mar. 5, 2009, Fubito Igari.
U.S. Appl. No. 12/398,556, filed Mar. 5, 2009, Fubito Igari.
U.S. Appl. No. 12/398,576, filed Mar. 5, 2009, Fubito Igari.
U.S. Appl. No. 12/398,585, filed Mar. 5, 2009, Fubito Igari.

Fubito Igari, U.S. PTO Notice of Allowance, U.S. Appl. No. 11/956,996, dated Mar. 12, 2010, 6 pages.

Fubito Igari, U.S. PTO Notice of Allowance, U.S. Appl. No. 12/398,585, dated Mar. 23, 2010, 8 pages.

Fubito Igari, U.S. PTO Office Action, U.S. Appl. No. 12/398,530, Mar. 9, 2010, 17 pages.

Fubito Igari, U.S. PTO Office Action, U.S. Appl. No. 12/398,513, Mar. 16, 2010, 16 pages.

Fubito Igari, U.S. PTO Office Action, U.S. Appl. No. 12/398,544, Mar. 16, 2010, 15 pages.

Fubito Igari, U.S. PTO Office Action, U.S. Appl. No. 12/398,576, Mar. 29, 2010, 14 pages.

F. Igari, U.S. PTO Office Action, U.S. Appl. No. 12/398,499, dated Aug. 14, 2009, 15 pgs.

Fubito Igari, U.S. PTO Office Action, U.S. Appl. No. 12/398,585, Aug. 21, 2009, 11 pages.

Fubito Igari, U.S. PTO Office Action, U.S. Appl. No. 11/956,996, Sep. 23, 2009, 7 pages.

F. Igari, U.S. PTO Notice of Allowance, U.S. Appl. No. 12/398,499, dated May 20, 2010, 5 pgs.

F. Igari, U.S. PTO Office Action, U.S. Appl. No. 12/398,556, dated May 25, 2010, 14 pgs.

F. Igari, U.S. PTO Notice of Allowance, U.S. Appl. No. 12/398,544, dated Jun. 11, 2010, 8 pgs.

F. Igari, U.S. PTO Office Action, U.S. Appl. No. 12/398,530, dated Jun. 11, 2010, 8 pgs.

Fubito Igari, U.S. PTO Final Office Action, U.S. Appl. No. 12/398,576, dated Jun. 30, 2010, 11 pages.

Fubito Igari, U.S. PTO Final Office Action, U.S. Appl. No. 12/398,513, dated Jul. 8, 2010, 12 pages.

Fubito Igari, U.S. PTO Notice of Allowance, U.S. Appl. No. 12/398,576, Aug. 30, 2010, 9 pages.

F. Igari, U.S. PTO Notice of Allowance, U.S. Appl. No. 12/398,556, dated Sep. 27, 2010, 8 pages.

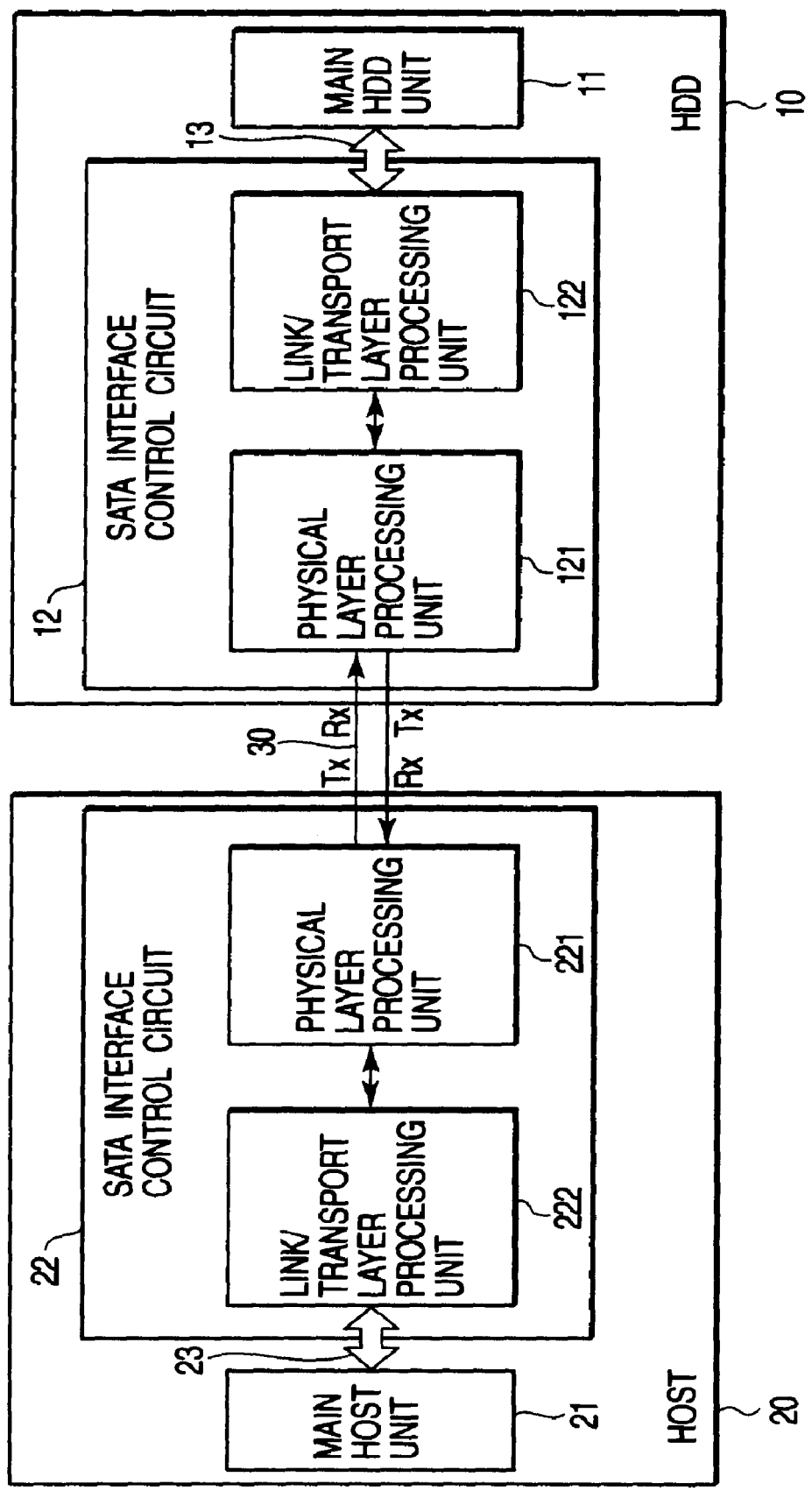
F I G. 1

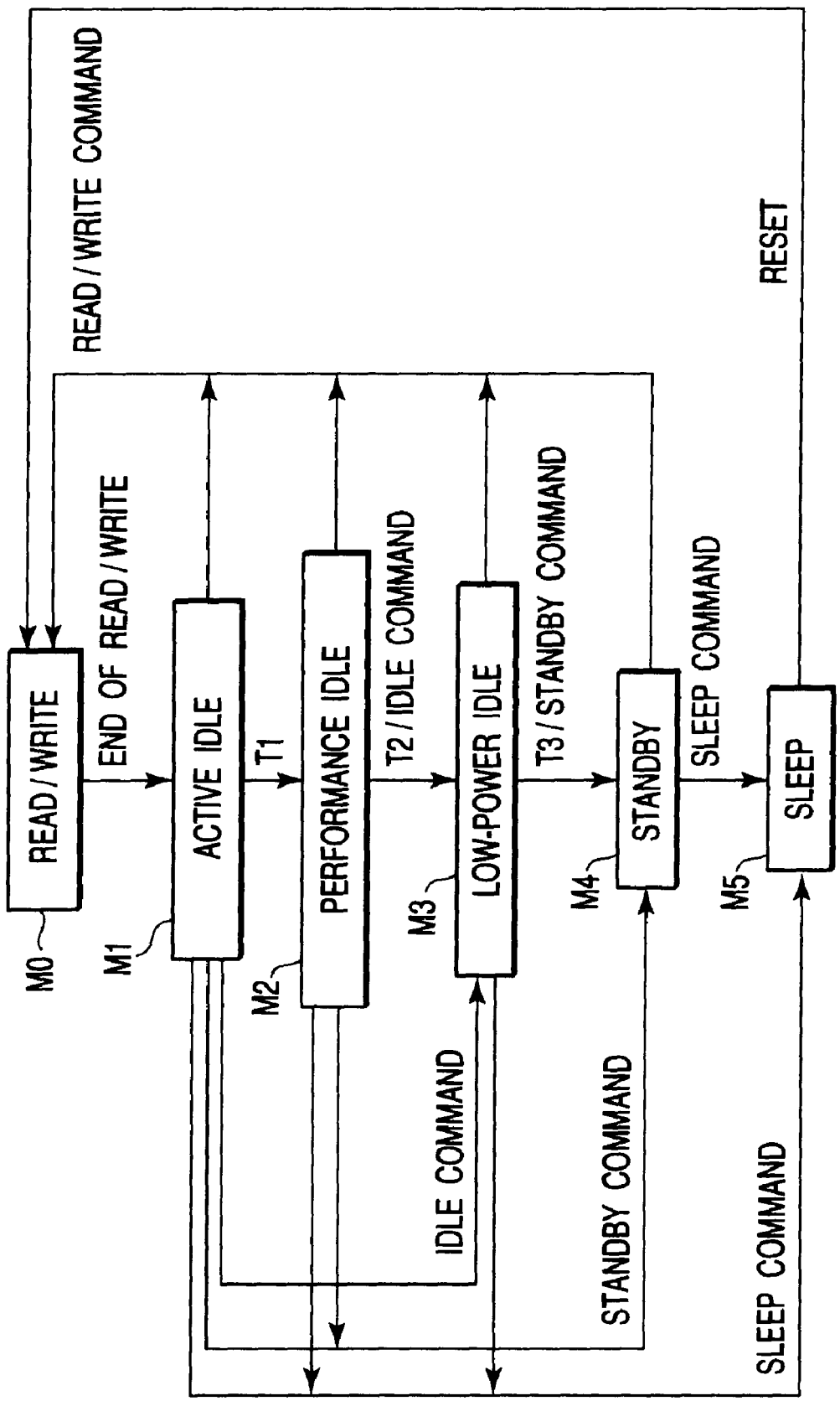
F I G. 3

| ATA POWER SAVING MODE | PARTIALLY TURNED-OFF CIRCUIT | TURNED-OFF CIRCUIT |
|---|---|---|
| READ/WRITE | NONE | NONE |
| ACTIVE IDLE | READ/WRITE IC | NONE |
| PERFORMANCE IDLE | MOTOR DRIVER IC READ/WRITE IC | NONE |
| LOW-POWER IDLE | MOTOR DRIVER IC | HEAD IC, READ/WRITE IC |
| STANDBY | NONE | SPM, MOTOR DRIVER IC, HEAD IC READ/WRITE IC, BUFFER RAM |
| SLEEP | HDC | SPM, MOTOR DRIVER IC, HEAD IC READ/WRITE IC, BUFFER RAM, CPU |

F I G. 4

ELECTRONIC DEVICE WITH SERIAL ATA INTERFACE AND POWER SAVING METHOD FOR SERIAL ATA BUSES

CROSS-REFERENCE TO RELATED APPLICATIONS

This application is a divisional of U.S. application Ser. No. 11/956,996 filed Dec. 14, 2007, which is a divisional of U.S. application Ser. No. 10/931,949 filed Sep. 1, 2004, which is based upon and claims the benefit of priority from prior Japanese Patent Application No. 2003-310361, filed Sep. 2, 2003, the entire contents of which are incorporated herein by reference.

BACKGROUND OF THE INVENTION

1. Field of the Invention

The present invention relates to an electronic device with a serial AT attachment (ATA) interface, and more particularly to an electronic device represented by a disk drive, and a power saving method for serial ATA buses, which are suitable for reducing the power consumption of a serial ATA bus that conforms to the serial interface ATA standards.

2. Description of the Related Art

As recited in "Serial ATA: High Speed Serialized AT Attachment" Revision 1.0a, Serial ATA Workgroup, Jan. 7, 2003 (hereinafter referred to as "the prior art document"), standards for serial ATA interfaces that are new interfaces for disk drives have been worked out. Serial ATA interfaces are used as interfaces between a peripheral device, represented by a magnetic disk drive, and a host (host system) represented by a personal computer. In this point, serial ATA interfaces are similar to conventional ATA interfaces (i.e., parallel ATA interfaces).

A peripheral device with a serial ATA interface, such as a magnetic disk drive (hereinafter referred to as an "HDD"), is connected to a host by a serial bus. In such an HDD, to secure compatibility with an ATA interface, it is necessary to convert an ATA interface into a serial ATA interface, and convert a serial ATA interface into an ATA interface. Such interface conversion is performed by, for example, an LSI (bridge LSI) called a serial ATA bridge.

In the serial ATA interface standards, three layers of different functions, i.e., a physical layer, link layer and transport layer, are defined. The physical layer has a function for executing high-rate serial data transmission and reception. The physical layer interprets received data, and transmits the data to the link layer in accordance with an interpretation result. The physical layer also outputs a serial data signal to the link layer in response to a request therefrom. The link layer supplies the physical layer with a request to output a signal. The link layer also supplies the transport layer with the data transmitted from the physical layer. The transport layer performs conversion for operations based on the ATA standards. Assuming that the above-mentioned bridge LSI is used in an HDD, the role of the transport layer corresponds to the role of the ATA signal output unit of a conventional host that utilizes an ATA connection. The bridge LSI is connected to the disk controller (HDC) of the HDD via an ATA bus (or a bus compliant with the ATA bus) based on the ATA interface standards. Accordingly, in the connection between the bridge LSI and HDC of the HDD, operations equivalent to those stipulated in the ATA interface standards or compatible with the standards are performed. In this case, the portion of the HDD excluding the bridge LSI (hereinafter referred to as a "main HDD unit") regards the bridge LSI as an apparatus (host) for issuing a command to the main HDD unit. Accordingly, the main HDD unit operates in the same manner as a conventional HDD utilizing an ATA connection. Thus, the serial ATA interface has compatibility with the ATA standards concerning protocols such as logical commands. However, a data signal (parallel data signal) processed by a parallel ATA interface must be converted into a serial data signal.

The serial ATA interface standards stipulate a power saving mode directed to serial ATA buses, as well as a power saving mode that conforms to the conventional ATA interface (parallel ATA interface) standards. The idea of serial ATA bus power saving does not exist in the conventional ATA standards.

The serial ATA interface standards stipulate three power management modes for serial ATA interfaces, i.e., "PHY READY (IDLE)", "PARTIAL" and "SLUMBER". The "PHY READY" mode indicates a state in which both the circuit (PHY circuit) for realizing the operation of a physical layer (PHY layer), and the main phase-locked loop (PLL) circuit are operating, thereby synchronizing the interfacing states of the host and peripheral device. The "PARTIAL" mode and "SLUMBER" mode indicate a state in which the PHY circuit is operating but the interface signal is in a neutral state.

The difference by definition between the "PARTIAL" mode and "SLUMBER" mode lies in the time required for restoration therefrom to the "PHY READY (IDLE)" mode. More specifically, it is stipulated that the time required for restoration from the "PARTIAL" mode must not exceed 10 μs. On the other hand, it is stipulated that the time required for restoration from the "SLUMBER" mode must not exceed 10 ms. As long as the restoration time and interface power state conform to the standards, manufacturers can select the portion of a device, the power saving function of which should be executed in the "PARTIAL" mode or "SLUMBER" mode (i.e., can select the circuit that should be turned off in the mode).

Shift to a power saving (ATA power saving) state conforming to the conventional ATA interface standards is realized basically under the control of a host. As ATA power saving modes, "IDLE", "STANDBY" and "SLEEP" modes, for example, are stipulated. On the other hand, shift to a power saving (serial ATA power saving) mode (i.e., the "PARTIAL" or "SLUMBER" mode) for serial ATA buses may be realized under the control of either a host or peripheral device. However, the above-mentioned prior art document describes nothing about a technique for controlling the serial ATA power saving state (in particular, a technique for associating the ATA power saving state with the serial ATA power saving state).

Assume here that a serial ATA interface is used as the interface of an HDD, and the HDD is connected to a host via a serial ATA bus. In this case, it is necessary, as stated above, to provide a serial ATA interface control circuit (serial ATA bridge) for converting a conventional ATA interface (parallel ATA interface) into a serial ATA interface. In this HDD, the operation of a junction between the serial ATA interface control circuit and the hard disk controller (HDC) of the HDD is identical to or conforms to that stipulated in the conventional ATA interface standards. Accordingly, the HDC recognizes the serial ATA bridge as if it were a host itself that issues commands. This means that the operations of the portions of the HDD other than the serial ATA bridge peripheral portions are similar to the conventional ones. In HDDs with serial ATA interfaces, a conventional ATA bus (i.e., parallel ATA bus) that connects a serial ATA interface control circuit to an HDC can be formed on the printed circuit board (PCB) of the HDD. Therefore, in HDDs with serial ATA interfaces, the wiring length of the ATA bus can be shortened, and hence an increase in data transfer rate, which is hard to realize if a parallel ATA bus is used, can be expected.

The serial ATA interface standards have been worked out on the assumption that they are compatible with the conventional ATA standards (parallel ATA standards). Therefore, to realize the new idea of power saving stipulated in the serial ATA standards, it is necessary to provide a host with new means for designating new power saving. However, such new means may well deviate from the conventional ATA standards. Further, the provision of new means to a host may significantly influence the entire system.

BRIEF SUMMARY OF THE INVENTION

In an embodiment of the invention, power consumption is reduced by effectively utilizing the power saving mode for serial ATA buses stipulated in the serial ATA standards.

In accordance with an embodiment of the invention, there is provided an electronic device with a serial ATA interface having a detector for detecting issue or reception of a predetermined command; a confirmation device for confirming completion of execution of the command detected by the detector; and a controller for controlling shifting of the serial ATA interface to a power saving mode upon confirmation of the completion of the execution by the confirmation device.

In accordance with yet another embodiment of the invention, there is provided a disk drive with a serial ATA interface connected to a host via a serial ATA bus. The disk drive has a reporting device for reporting, to the host, completion of execution of a command sent from the host to the disk drive; and a controller for controlling shift of the serial ATA interface to a power saving mode after the reporting device reports completion of execution of a preset command.

Yet further embodiments of the invention relates to a method of saving power of a serial ATA interface employed in an electronic device. The method detects issue or reception of a preset command; confirms completion of execution of the detected command; and shifts the serial ATA interface to a power saving mode upon confirming the completion of execution of the detected command.

Another embodiment of the invention pertains to a method of performing interface conversion between a serial ATA interface and a parallel ATA interface. This method measures a preset time starting each time the serial ATA interface is shifted to an idle mode in accordance with reception of a command which requires interface conversion; and shifts the serial ATA interface from the idle mode to a predetermined power saving mode if no further command has been sent after expiration of the preset time.

Yet another embodiment of the invention involves a method for saving power in a disk drive with a serial ATA interface connected to a host via a serial ATA bus. The method reports to the host completion of execution of a command sent from the host to the disk drive; and controls shifting of the serial ATA interface to a power saving mode after the reporting device reports completion of execution of a preset command.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating the configuration of a system, equipped with a magnetic disk drive (HDD) 10, according to an embodiment of the invention;

FIG. 3 is a view illustrating shift of ATA power saving modes employed in the embodiment;

FIG. 4 is a view illustrating the relationship between each ATA power saving mode in FIG. 3 and the turned-off state of each circuit of an HDD main unit 11 in each ATA power saving mode;

DETAILED DESCRIPTION OF THE INVENTION

Figure 2:
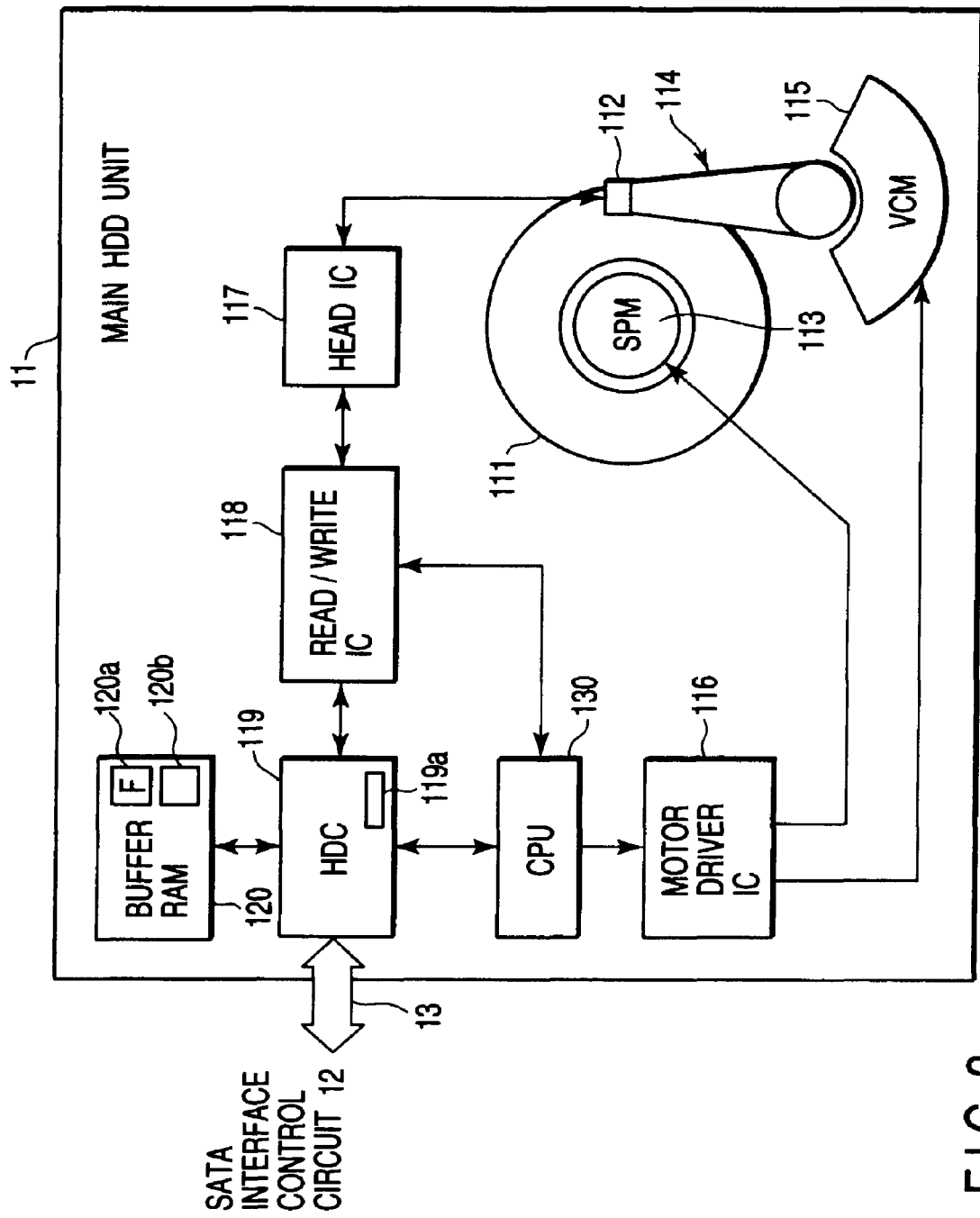
FIG. 2 is a block diagram illustrating a main HDD unit 11 incorporated in the HDD 10 appearing in FIG. 1.

An embodiment in which the invention is applied to a system equipped with a magnetic disk drive having a serial ATA (SATA) interface will be described in detail with reference to the accompanying drawings. FIG. 1 is a block diagram illustrating the configuration of the system equipped with the magnetic disk drive (HDD) 10, according to the embodiment of the invention. As shown, the HDD 10 comprises a main HDD unit 11 and SATA interface control circuit 12. The main HDD unit 11 corresponds to a conventional HDD for performing parallel data transfer using an ATA interface. The SATA interface control circuit 12 is a SATA (serial ATA) bridge for peripheral devices. The SATA interface control circuit 12 is connected to a host (host system) 20 via an SATA bus (serial ATA bus) 30. The SATA interface control circuit 12 is used to perform interface conversion between an ATA interface and SATA interface, and is formed of, for example, a large-scale integrated circuit (LSI). The SATA interface control circuit 12 has, in particular, a function for converting an instruction, sent via the SATA bus 30, into an instruction suitable for an ATA bus 13 (ATA interface), and sending it to the main HDD unit 11 via the ATA bus 13.

The host 20 is an electronic device, such as a personal computer, which uses the HDD 10 as storage. The host 20 comprises a main host unit 21 and SATA interface control circuit 22. The main host unit 21 corresponds to a conventional host for performing parallel data transfer using an ATA interface. The SATA interface control circuit 22 is a host bridge, and is connected to the main host unit 21 via an ATA bus (parallel ATA bus) 23, and to the HDD 10 via the SATA bus (serial ATA bus) 30. The SATA interface control circuit 22 is formed of an LSI for performing interface conversion between an ATA interface and an SATA interface, like the SATA interface control unit 12 of the HDD 10. The SATA interface control circuit 22 has, in particular, a function for converting an instruction, sent via the SATA bus 30, into an instruction suitable for the SATA bus 30 (SATA interface), and sending it to the HDD 10 via the SATA bus 30.

The SATA interface control circuits 12 and 22 have physical layer processing units 121 and 221 and link/transport layer processing units 122 and 222, respectively. The physical layer processing units 121 and 221 execute high-rate serial data transfer (transmission/reception) via the SATA bus 30. At this time, the data transfer rate is 1.5 Gbps (gigabits per second). The physical layer processing units 121 and 221 interpret data received from the SATA bus 30, and transmits the data to the link/transport layer processing units 122 and 222 in accordance with the interpretation results, respectively. Further, the physical layer processing units 121 and 221 transmit respective serial data signals in response to requests from the link/transport layer processing units 122 and 222, respectively. The link/transport layer processing units 122 and 222 each include a link layer processing unit and transport layer processing unit, which are not shown. The respective link layer processing units of the link/transport layer processing units 122 and 222 supply the physical layer processing units 121 and 221 with requests to output signals, in response to requests from the transport layer processing units of the processing units 122 and 222. Further, the respective link layer processing units of the processing units 122 and 222 supply the respective transport layer processing units with data transmitted from the physical layer processing units 121 and 221. The transport layer processing units perform interface conversion between the ATA interface and SATA interface.

Buses, such as peripheral component interconnect (PCI) buses, compatible with the ATA buses 13 and 23 may be employed instead of the ATA buses 13 and 23. In this case, the SATA interface control circuits 12 and 22 can be provided in a PCI bridge. Further, it is sufficient if the SATA interface control circuits 12 and 22 (SATA bridges) have a function for transmitting and receiving serial ATA interface signals to and from the SATA bus 30.

FIG. 2 is a block diagram illustrating the configuration of the main HDD unit 11. The main HDD unit 11 has a disk 111 as a recording medium. At least one surface of the disk 111 is a recording surface on which data is magnetically recorded. A head (magnetic head) 112 opposes the at least one recording surface of the disk 111. FIG. 2 shows a case where the main HDD unit 11 (HDD 10) includes only one head 112, for facilitating the drawing of the figure. However, in general, both surfaces of the disk 111 serve as recording surfaces, which respective heads oppose. Further, in the example of FIG. 2, it is assumed that the main HDD unit 11 (HDD 10) includes a single disk 111. However, it may include a plurality of disks 111 stacked on each other.

The disk 111 is spun at high speed by a spindle motor (SPM) 113. The head 112 is used to read and write data from and to the disk 111. The head 112 is attached to the tip of an actuator 114. The actuator 114 has a voice coil motor (VCM) 115. The actuator 114 is driven by the VCM 115, thereby radially moving the head 112 over the disk 111. As a result, the head 112 is positioned on a target track. The SPM 113 and VCM 115 are powered by respective driving currents (SPM current and VCM current) supplied from a motor driver IC 116. The motor driver IC 116 supplies the SPM 113 with an SPM current designated by a CPU 130, and supplies the VCM 115 with a VCM current designated by the CPU 130.

The head 112 is connected to a head IC (head amplifier circuit) 117. The head IC 117 includes a read amplifier for amplifying a read signal read by the head 112, and a write amplifier for converting write data into a write current. The head IC 117 is connected to a read/write IC (read/write channel) 118. The read/write IC 118 is a signal processing device for performing various kinds of signal processing such as analog-to-digital conversion of a read signal, encoding of write data, decoding of read data, etc. The read/write IC 118 is connected to a hard disk controller (HDC) 119.

The HDC 119 has a disk control function for controlling data transfer from and to the disk 111. The HDC 119 includes an ATA interface. That is, the HDC 119 has an ATA interface control function for receiving and transmitting commands (such as read/write commands) and data from and to the host 20 via the ATA bus 13. However, in the embodiment that includes the HDD 10 having a SATA interface, the HDC 119 is connected to the SATA interface control circuit 12 via the ATA bus 13, which differs from conventional HDDs. The HDC 119 is connected to the host 20 via the SATA interface control circuit 12 and SATA bus 30. The HDC 119 has a buffer control function for controlling a buffer RAM 120. The HDC 119 includes a status register 119a used for reporting the state of the HDD 10 to the host 20.

A part of the memory area of the buffer RAM 120 is used as a data buffer area for temporarily storing data transferred between the host 20 and the HDC 119 of the HDD 10. Another part of the memory area of the buffer RAM 120 is used as a flag storage area 120a for storing a flag F described later, and as a command reception time storage area 120b for storing time information indicating the time at which a command has been received. The area 120b is used as a ring buffer for storing time information indicating the points in time at which a predetermined number of most recent commands have been received.

The CPU 130 is a main controller in the main HDD unit 11 (HDD 10). The CPU 130 includes a nonvolatile memory (not shown) that prestores a control program (e.g., a flash ROM as a programmable nonvolatile memory). The CPU 130 controls each element in the HDD 10 in accordance with the control program prestored in the nonvolatile memory. If the HDC 119 receives, from the host 20, a particular command for designating a power saving mode for the ATA interface (ATA power saving mode), the CPU 130 sets the HDD 10 to the ATA power saving mode designated by the command. When setting the ATA power saving mode, the CPU 130 causes, via the HDC 119 and SATA bus 13, the SATA interface control circuit 12 to set a SATA power saving mode related in advance to the ATA power saving mode.

FIG. 3 is a view illustrating shift of ATA power saving modes (power saving modes that conform to the ATA interface standards) employed in the embodiment. In the embodiment, ATA power saving modes include five modes—ACTIVE IDLE MODE M1, PERFORMANCE IDLE MODE M2, LOWER-POWER IDLE MODE M3, STANDBY MODE M4 and SLEEP MODE M5. In addition to the power saving modes M1 to M5, READ/WRITE MODE (ACTIVE MODE) M0 is provided as another ATA interface mode for enabling a read/write command to be executed. The power consumption is reduced in the order of the READ/WRITE MODE M0, ACTIVE IDLE MODE M1, PERFORMANCE IDLE MODE M2, LOW-POWER IDLE MODE M3, STANDBY MODE M4 and SLEEP MODE M5.

In the HDD 10 (main HDD unit 11), after a read/write operation commanded by a read/write command is performed in the READ/WRITE MODE M0, the HDD 10 is shifted to the ACTIVE MODE M1 under the control of the CPU 130 for reducing the power consumption of the HDD 10. If no further command has been sent from the host 20 after a predetermined time T1 elapses from the shift to the ACTIVE IDLE MODE M1, the HDD 10 is autonomously shifted to the PERFORMANCE IDLE MODE M2 under the control of the CPU 130 to further reduce the power consumption of the HDD 10. The Modes M1 and M2 are ATA power saving modes arbitrarily designated by a manufacturer.

If no further command has been sent from the host 20 after a predetermined time T2 elapses from the shift to the PER- FORMANCE IDLE MODE M2, the HDD 10 is autonomously shifted to the LOW-POWER IDLE MODE M3 under the control of the CPU 130 to further reduce the power consumption of the HDD 10. The Mode M3 corresponds to "IDLE" in the ATA interface standards. Accordingly, if an idle command is sent from the host 20 in the mode M1 or M2, the ATA power saving mode of the HDD 10 is shifted to the LOW-POWER IDLE MODE M3 in accordance with the command. Similarly, if a standby command is sent from the host 20 in the mode M1, M2 or M3, the ATA power saving mode of the HDD 10 is shifted to the STANDBY MODE M4 in accordance with the command. Standby Immediate Command is known as a kind of standby command. Using this command, the time required for the shift to the standby mode can be designated. Upon issuing the Standby Immediate Command, the mode is shifted to the STANDBY MODE M4 after the designated time elapses. Further, if a sleep command is sent from the host 20 in the mode M1, M2, M3 or M4, the ATA power saving mode of the HDD 10 is shifted to the SLEEP MODE M5 in accordance with the command. If a read/write command is sent from the host 20 in the mode M1, M2, M3, M4 or M5, the ATA power saving mode of the HDD 10 is shifted to the READ/WRITE MODE M0 in accordance with the command.

FIG. 4 shows the relationship between each mode M0 to M5 in FIG. 3 and the turned-off state of each circuit of the HDD main unit 11 in each mode M0 to M5. In the READ/WRITE MODE M0, power is supplied to each circuit in the main HDD unit 11 so that read and write operations can be performed simultaneously in the main HDD unit 11. In each of the ACTIVE IDLE MODE M1, PERFORMANCE IDLE MODE M2 and LOW-POWER IDLE MODE M3, the supply of power to part of the circuits in the main HDD unit 11 is halted. In the ACTIVE IDLE MODE M1, the disk 111 is rotated by the SPM 113 and the head 112 is positioned, by servo control, on a certain track of the disk 111. In the PERFORMANCE IDLE MODE M2, the disk 111 is rotated by the SPM 113 and the head 112 is positioned on an arbitrary track without servo control. In the LOW-POWER IDLE MODE M3, although the disk 111 is rotated by the SPM 113, the head 112 is retracted from the disk 111. Accordingly, in the ACTIVE IDLE MODE M1, only the supply of power to part (i.e., a write channel) of the read/write IC 118 is halted. On the other hand, in the PERFORMANCE IDLE MODE M2, the supply of power to part (i.e., a VCM driver) of the motor driver IC 116 and part of the read/write IC 118 is halted. Further, in the LOW-POWER IDLE MODE M3, the supply of power to part of the motor driver IC 116 is halted, and the supply of power to the head IC 117 and read/write IC 118 is halted. The time required until the read/write mode M0 is restored (i.e., the restoration time required until the read/write operations become able to be re-executed) differs between the above-mentioned idle modes. This restoration time is set longer in the order of the ACTIVE IDLE MODE M1, PERFORMANCE IDLE MODE M2 and LOW-POWER IDLE MODE M3. The required power consumption is lower in the order of the ACTIVE IDLE MODE M1, PERFORMANCE IDLE MODE M2 and LOW-POWER IDLE MODE M3. In other words, the longer the restoration time, the lower the power consumption.

In the STANDBY MODE M4, the rotation of the SPM 113 is stopped. In this mode, the supply of power to the SPM 113, motor driver IC 116, head IC 117, read/write IC 118 and buffer RAM 120 is halted. Accordingly, the power consumption is lower in the STANDBY MODE M4 than in the LOW-POWER IDLE MODE M3, whereas the restoration time is longer in the former than in the latter. In the SLEEP MODE M5, power is supplied only to part (i.e., a reset processing circuit) of the HDC 119, the supply of power to the other circuits being halted. Restoration from the SLEEP MODE M5 to the READ/WRITE MODE M0 can be realized only by a reset operation, and the required restoration time is almost equal to that required for restoration from the STANDBY MODE M4. Of the modes M0 to M5, the power consumption is minimum in the SLEEP MODE M5.

Figure 5:
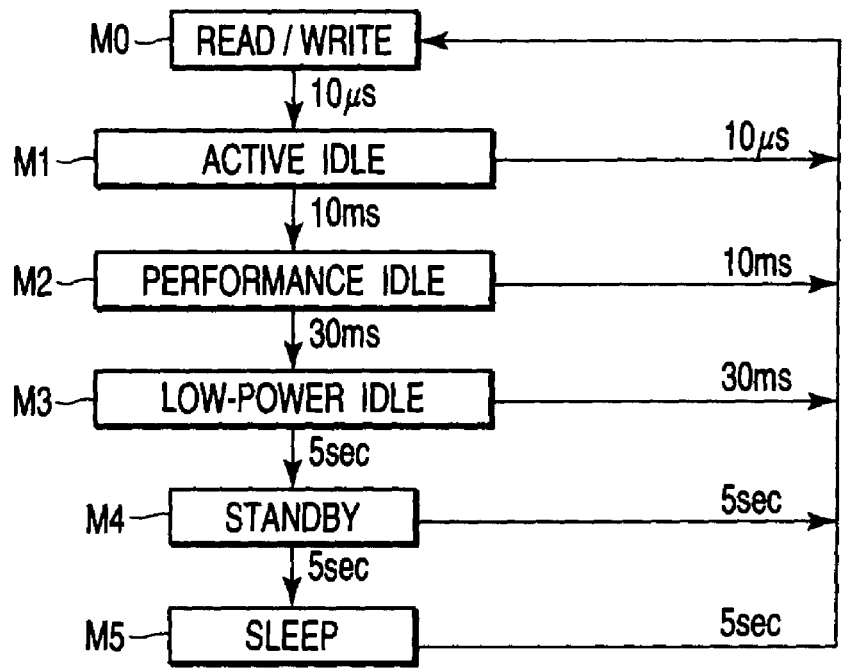
FIG. 5 is a view illustrating examples of times required for restoration, to a read/write mode M0, from each ATA power saving mode M1 to M5 in FIG. 3.
Figure 6:
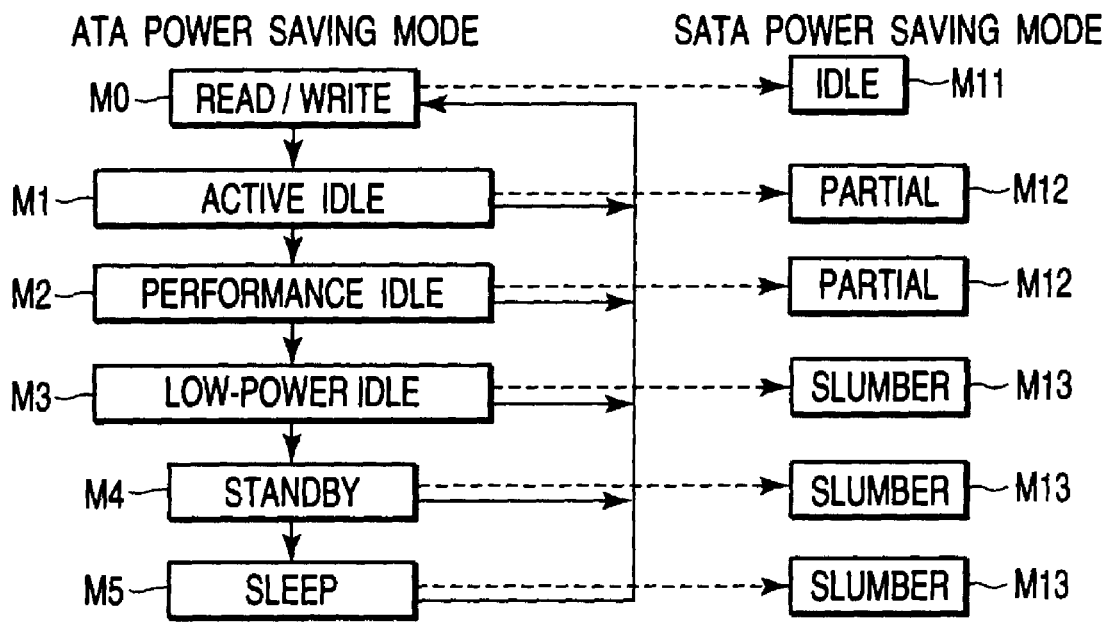
FIG. 6 is a view illustrating the relationship between each ATA power saving mode in FIG. 3 and the corresponding SATA (serial ATA) power saving mode set when the HDD 10 is in each ATA power saving mode.

FIG. 5 shows examples of times required for restoration from each mode M1 to M5 to the read/write mode M0. FIG. 6 shows the relationship between each mode M0 to M5 and the corresponding SATA power saving mode set by the CPU 130 when the HDD 10 is in each mode M0 to M5. In the example of FIG. 6, when the ATA power saving mode (ATA interface mode) is the READ/WRITE MODE M0, the SATA power saving mode (SATA interface mode) is set to IDLE MODE M11. Further, when the ATA power saving mode is the ACTIVE IDLE MODE M1 or PERFORMANCE IDLE MODE M2, the SATA power saving mode is set to PARTIAL MODE M12. However, since the PERFORMANCE IDLE MODE M2 is set only after the ACTIVE IDLE MODE M1, the PARTIAL MODE M12 is maintained when the HDD 10 is shifted to the PERFORMANCE IDLE MODE M2. Further, when the ATA power saving mode is the LOW-POWER IDLE MODE M3, STANDBY MODE M4 or SLEEP MODE M5, the SATA power saving mode is set to SLUMBER MODE M13.

Figure 7:
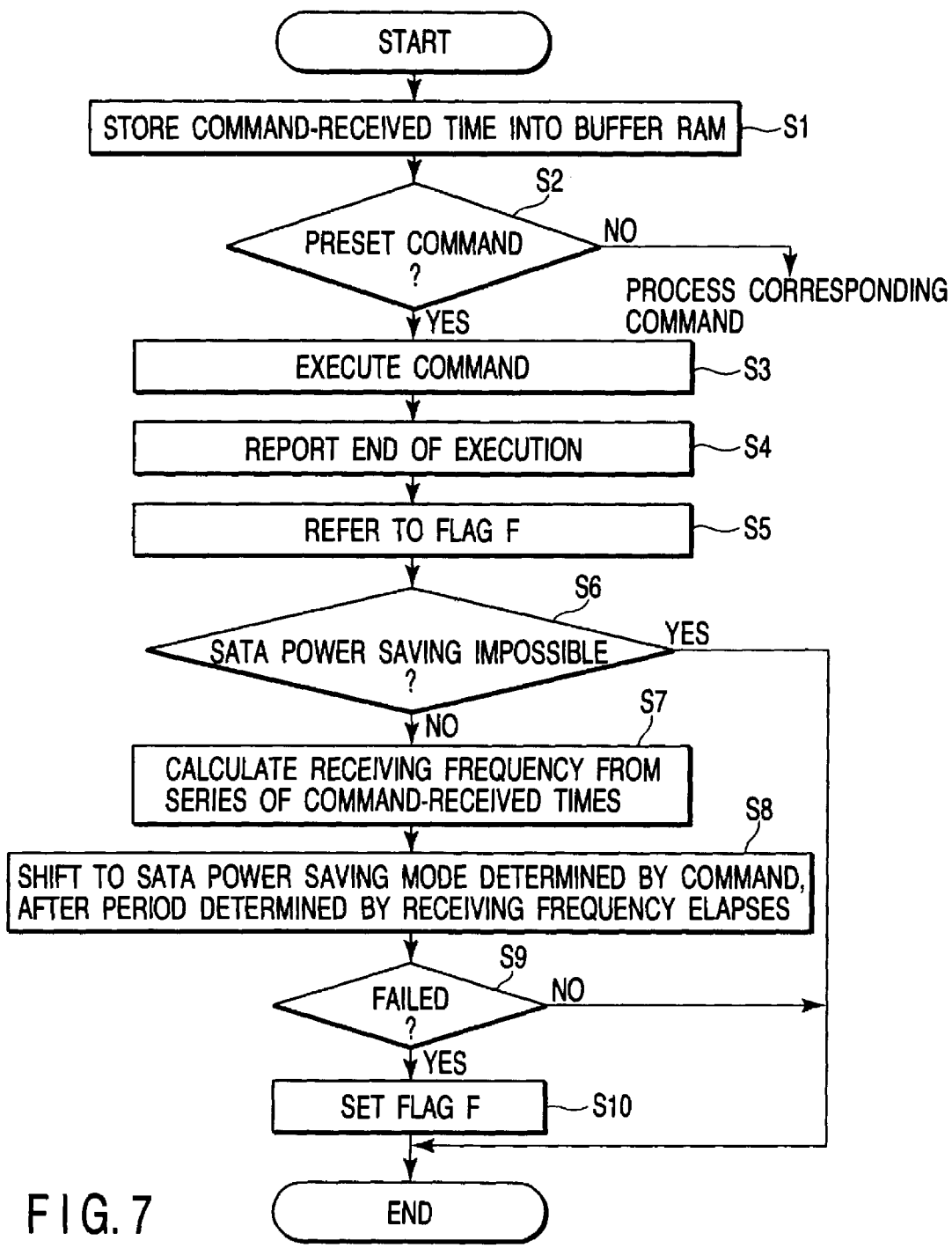
FIG. 7 is a flowchart useful in explaining power control performed when the main HDD unit 11 of the HDD 10 has received a command from a host 20.

Referring now to the flowchart of FIG. 7, an operation of the system shown in FIG. 1 will be described, using, as an example, power control executed when the main HDD unit 11 of the HDD 10 has received a command from the host 20. Assume here that the main host unit 21 of the host 20 has issued, to the ATA bus 23, an HDD-directed command that conforms to the ATA interface standards. The command on the ATA bus 23 is received by the SATA interface control circuit 22 of the host 20. The link/transport layer processing unit 222 of the SATA interface control circuit 22 converts the received command into a command conforming to the SATA interface standards (i.e., into a command suitable for the SATA bus 30), and sends it to the SATA bus 30. The command on the SATA bus 30 is received by the SATA interface control circuit 12 of the HDD 10. The link/transport layer processing unit 122 of the SATA interface control circuit 12 converts the received command into a command conforming to the ATA interface standards (i.e., into a command suitable for the ATA bus 13), and sends it to the ATA bus 13. The command on the ATA bus 13 is received by the HDC 119 incorporated in the main HDD unit 11 of the HDD 10. The HDC 119 recognizes the SATA interface control circuit 12 as a host. The command received by the HDC 119 is transferred to the CPU 130.

Upon receiving the command from the HDC 119, the CPU 130 stores, into the command reception time storage area 120b, command reception time information indicating the time at which the command was received (step S1). Subsequently, the CPU 130 determines whether the received command is one of the preset commands (step S2). The preset commands indicate commands related to power saving, such as an idle command, standby command and sleep command.

If the received command is one of the preset commands, the CPU 130 performs the following processing. Firstly, the CPU 130 interprets the received command and executes the operation indicated by the command (step S3). Specifically, if the received command is an idle command, the CPU 130 shifts the ATA power saving mode of the HDD 10 to the LOW-POWER IDLE MODE M3. Further, if the received command is a standby command, the CPU 130 shifts the ATA power saving mode of the HDD 10 to the STANDBY MODE M4. If the received command is a sleep command, the CPU 130 shifts the ATA power saving mode of the HDD 10 to the SLEEP MODE M5.

Upon completing the execution of the command and confirming the completion, the CPU 130 executes processing for reporting the completion of the execution of the command to the host 20 (step S4). Specifically, the CPU 130 sets, in the status register 119a, a response status indicating the completion of the execution of the command, and sends an interrupt signal to the ATA bus 13. The SATA interface control circuit 12 reads the contents of the status register 119a in response to the interrupt signal. Based on the read contents of the status register 119a, the SATA interface control circuit 12 sends, to the host 20 via the SATA bus 30, a report of the completion of a command (hereinafter referred to as a "command execution completion report"), the report conforming to the SATA interface standards. Upon receiving the command execution completion report from the SATA bus 30, the SATA interface control circuit 22 of the host 20 sends an interrupt signal to the main host unit 21 via the ATA bus 23. In response to the interrupt signal, the main host unit 21 receives the command execution completion report (i.e., a response indicating the completion of the command, which will hereinafter be referred to as a "command completion response") from the SATA interface control circuit 22.

In the embodiment, if the command sent from the host 20 to the HDD 10 is one of the preset commands, i.e., one of the commands related to power saving, the CPU 130 performs SATA power saving mode control on the SATA interface control circuit 12 (i.e., power control for the SATA bus 30). In this control, if the command is an idle command, standby command or sleep command, the SATA power saving mode is shifted to the SLUMBER MODE M13. As a result, the serial ATA power saving function stipulated in the serial ATA standards can be effectively utilized to reduce the power consumption, with the compatibility with the conventional ATA standards maintained.

The control of the SATA power saving mode by the CPU 130 is achieved by sending a particular primitive to the link/transport layer processing unit 122 (link layer processing unit) of the SATA interface control circuit 12 via the ATA bus 13. The particular primitive contains a signal pattern for designating a SATA power saving mode that conforms to the SATA interface standards. The SATA interface control circuit 12 may include a control register for SATA power saving mode control. In this case, the SATA bus 30 can be set to a target SATA power saving mode by controlling the control register by the CPU 130.

For the reason stated below, the embodiment does not employ a mechanism in which after the completion of a command related to ATA power saving is reported (i.e., after a command completion response), the SATA bus 30 is immediately shifted to the corresponding SATA power saving mode. If the SATA bus 30 is shifted to the SLUMBER MODE M13 immediately after the completion of the execution of a command is reported, and if a response indicating the completion of a subsequent command must be issued, a restoration time of 10 ms at maximum is required until the response becomes able to be returned. In other words, according to the definition of the SLUMBER MODE M13, a period of 10 ms is required at maximum when the SATA bus 30 is restored from the SLUMBER MODE M13 to the IDLE MODE M11. For example, assume that the host 20 issues, to the HDD 10, a standby command, for example, a standby immediate command, and then monitors halting of the SPM 113 using a check power mode command. In this case, if the SATA power saving mode is shifted to the SLUMBER MODE M13 immediately after the completion of the execution of the standby immediate command is reported (i.e., after a command completion response), the speed of a response indicating the completion of a subsequent check power mode command is inevitably reduced. In light of this, in the embodiment, the SATA bus 30 is not unconditionally shifted to the SLUMBER MODE N413 immediately after a command completion response.

This will now be described in more detail. Assume here that the host 20 issues a check power mode command to the HDD 10 immediately after the SATA bus 30 is shifted to the SLUMBER MODE 13 upon the completion of the execution of a standby immediate command. In this case, when the check power mode command is issued, the SATA bus 30 is already shifted to the SLUMBER MODE M13. To transmit a command from the host 20 to the HDC 119 of the HDD 10 via the SATA bus 30, it is necessary to restore the SATA bus 30 to a command transmittable state, i.e., the IDLE MODE M11. That is, to transmit the check power mode command, the SATA interface control circuit 22 of the host 20 executes a restoration procedure. As a result, the host 20 recognizes that a response from the HDD 10 indicating the completion of the execution of the check power mode command is delayed by the time required for the restoration of the SATA bus 30 to the IDLE MODE M11.

The command (check power mode command) issued from the host 20 reaches the HDD 10, after the SATA bus 30 is restored from the SLUMBER MODE M13 (power saving state) to the IDLE MODE M11 in accordance with the issue of the command to thereby make the host 20 and HDD 10 accessible. At this time, the link/transport layer processing unit 122 (transport layer processing unit) of the SATA interface control circuit 12 is operated to transfer the command to the HDC 119 of the HDD 10. Thus, the command issued from the host 20 reaches the HDC 119 of the HDD 10, delayed by the restoration time of the SATA bus 30. However, the HDC 119 cannot recognize the delay.

Because of this, when the SATA power saving mode is controlled, the frequency of reception of a command is calculated (step S7). The command reception frequency is calculated from a sequence of, for example, a predetermined number of command reception time points indicated by command reception time information stored in the command reception time storage area 120b of the buffer RAM 120. The average of the command reception intervals or the highest probable command reception interval can be used as the command reception frequency. Further, a sequence of command reception time points within a certain time period around the present time point may be used instead of a sequence of a predetermined number of command reception time points.

From the calculated command reception frequency (command reception interval), the CPU 130 determines the time at which the SATA bus is shifted to the SATA power saving mode determined by the currently received command, and performs control so that the SATA power saving mode is realized at the determined time (step S8). Assume here that the calculated command reception frequency, i.e., the command reception interval, is Tc. In this case, if the HDC 119 has not received a subsequent command when Tc elapses, the CPU 130 causes the SATA interface control circuit 12 to shift the SATA bus 30 to the SATA power saving mode determined by the currently received command. As a result, control of shifting the SATA bus to the SATA power saving mode determined by a command related to ATA power saving is delayed by Tc while a subsequent command is being executed. In this case, the issue of a response indicating completion of the subsequent command, if the host 20 has issued the subsequent command at this time, is prevented from being delayed.

It is very possible that the host 20 will issue a check power mode command to the HDD 10 after the issue of a command related to ATA power saving. Because of this, after the issue of a response indicating the completion of a command related to ATA power saving, the CPU 130 may confirm a halt of the SPM 113, and performs control for shifting the SATA bus to the SLUMBER MODE M13, a predetermined time period after the time of confirmation. This control can also prevent delay of the issue of a response indicating the completion of a subsequent command. Alternatively, the shift to the SLUMBER MODE M13 may be performed a predetermined time after the latest reception of a command that does not require restart of the SPM 113. In the embodiment, regardless of whether a command from the host 20, related to ATA power saving, is a standby command or sleep command, the SATA power saving mode is set to the SLUMBER MODE M13. However, depending upon the type of command or the structure of the SATA interface control circuit 12 (the capability of restoring to the IDLE MODE M111), the SATA power saving mode may be set to the PARTIAL MODE M12 from which the SATA bus can be restored to the IDLE MODE M11 in a shorter period.

In the embodiment, to reduce the power consumption of the HDD 10, the HDD 10 employs the structure as shown in FIG. 3, in which the ATA power saving mode is autonomously shifted between the set modes, regardless of a command, from the host 20, related to the ATA power saving. Specifically, immediately after read/write processing is finished in the read/write mode M0, the CPU 130 of the HDD 10 shifts the HDD 10 from the READ/WRITE MODE M0 to the ACTIVE IDLE MODE M1. Further, if no further command has been sent from the host 20 when a predetermined time T1 elapses after the shift to the ACTIVE IDLE MODE M1, the CPU 130 shifts the HDD 10 from the ACTIVE IDLE MODE M1 to the PERFORMANCE IDLE MODE M2. Similarly, if no further command has been sent from the host 20 when a predetermined time T2 elapses after the shift to the PERFORMANCE IDLE MODE M2, the CPU 130 shifts the HDD 10 from the PERFORMANCE IDLE MODE M2 to the LOW-POWER IDLE MODE M3. It is advisable, for example, to dynamically and periodically change the times T1 and T2 based on the previously mentioned command reception frequency (command reception interval).

In the embodiment, when ATA power saving mode shift is autonomously performed in the HDD 10 under the control of the CPU 130, SATA power saving mode shift is performed in synchrony with the autonomous ATA power saving mode shift as shown in FIG. 6. Specifically, during a shift from the READ/WRITE MODE M0 to the ACTIVE IDLE MODE M1, the SATA power saving mode is shifted from the IDLE MODE M11 to the PARTIAL MODE M12. Further, during a shift from the ACTIVE IDLE MODE M1 to the PERFORMANCE IDLE MODE M2, the SATA power saving mode is maintained in the PARTIAL MODE M12. During a shift from the PERFORMANCE IDLE MODE M2 to the LOW-POWER IDLE MODE M3, the SATA power saving mode is shifted from the PARTIAL MODE M12 to the SLUMBER MODE M13. In the LOW-POWER IDLE MODE M3, the head 112 is retracted from the disk 111. When the HDD 10 is in the LOW-POWER IDLE MODE M3, if the host 20 supplies the HDD 10 with a read/write command, the time required for restoration to the READ/WRITE MODE M0 is relatively long and exceeds 30 ms (see FIG. 5). In this case, it is effective to set the SATA bus 30 (SATA interface) to the SLUMBER MODE M13 as in the embodiment, in order to suppress power consumption.

Access to the HDD 10 by the host 20 is liable to be often centralized or decentralized. For example, there is a case where no command is received for a certain time after a state, in which the command reception interval is very short, continues. In this case, it is advisable for the CPU 130 to estimate that the host 20 has finished execution of an application, and to set the HDD to an ATA power saving mode in which the power consumption is reduced in a relatively short time. Further, in a case where the command reception interval is relatively long and this state continues for a long time, i.e., where the HDD 10 is continuously accessed for a long time, it is advisable for the CPU 130 to set an ATA power saving mode in which the time required until the power consumption is reduced is relatively long. In both cases, the SATA power saving mode is controlled in synchronism with the ATA power saving mode.

Figure 8:
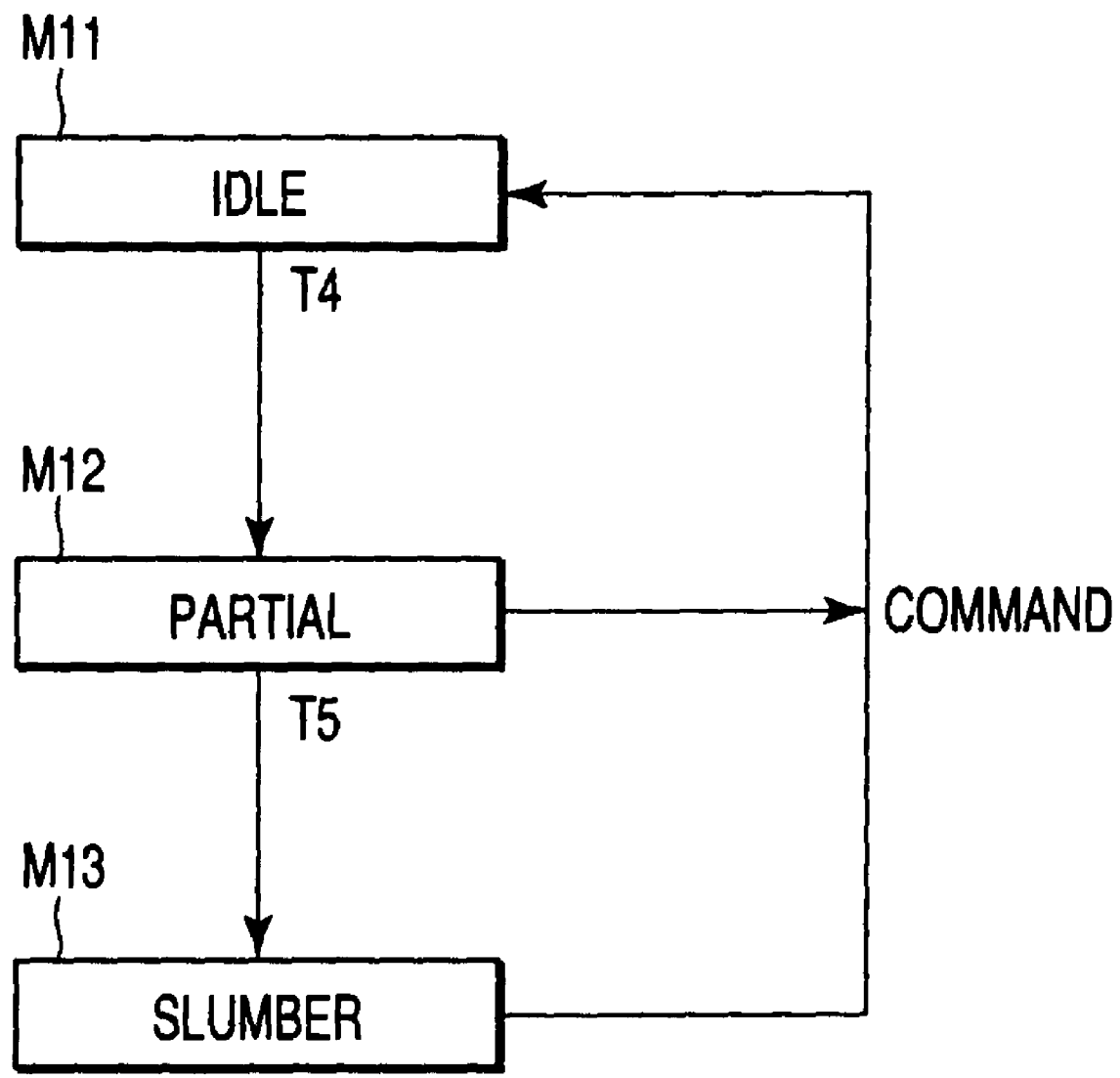
FIG. 8 is a view illustrating shift of SATA power saving modes employed in a modification of the embodiment.

In the embodiment, the CPU 130 of the HDD 10 controls the SATA power saving mode (mode for saving the power of the SATA bus 30). However, the SATA interface control circuit 12 can perform this control. FIG. 8 shows shift of states when the SATA interface control circuit 12 controls the SATA power saving mode. Assume that the SATA interface control circuit 12 has received a command from the host 20, whereby the SATA bus 30 is shifted (restored) to the IDLE MODE M11. If no new command has been sent from the host 20 when a predetermined time T4 elapses after the time of the shift to the IDLE MODE M11, the SATA interface control circuit 12 performs control for shifting the SATA bus 30 from the IDLE MODE M11 to the PARTIAL MODE M12. Further, if no new command has been sent from the host 20 when the predetermined time T5 elapses after the time of the shift to the PARTIAL MODE M12, the SATA interface control circuit 12 performs control for shifting the SATA bus 30 from the PARTIAL MODE M12 to the SLUMBER MODE M13. The SLUMBER MODE M13 is continued until a new command is sent from the host 20. The predetermined times T4 and T5 may be measured using one or more timers (time measurement means) and T4 may be equal to T5. Alternatively, when the SATA bus is shifted from the IDLE MODE M11 to the PARTIAL MODE M12, the PARTIAL MODE M12 may be continued until a new command is sent from the host 20. Also, the SATA bus may be directly shifted from the IDLE MODE M11 to the SLUMBER MODE M13. Furthermore, the SATA power saving mode control function may be imparted from the SATA interface control circuit 12 to the HDC 119 of the HDD 10.

In the embodiment, SATA power saving mode control (power saving of the SATA bus 30) is performed under the control of the HDD 10. For the SATA power saving mode control, it is necessary to make both the SATA interface control circuit 12 of the HDD 10 and the SATA interface control circuit 22 of the host 20 support the SATA power saving mode (i.e., to make the circuits 12 and 22 support the SATA power saving function). If the SATA interface control circuit 22 does not support the SATA power saving mode (the PARTIAL MODE M12 or SLUMBER MODE M13), a shift to the SATA power saving mode (the PARTIAL MODE M12 or SLUMBER MODE M13) is impossible. In the description below, the fact that the SATA interface control circuit 22 does not support the SATA power saving mode is equivalent to the expression that the host 20 does not support the SATA power saving mode. The method for recognizing whether a SATA interface control circuit supports the SATA power saving mode is stipulated in the SATA interface standards. The SATA interface standards stipulate that from the mutual operations of SATA interface control circuits connected by a SATA bus (in the embodiment, the SATA interface control circuits 12 and 22), whether these circuits support the SATA power saving mode is recognizable. Assume here that the host 20 connected to the HDD 10 via the SATA bus 30 does not support the SLUMBER MODE M13. In this case, each time an instruction to shift the SATA bus to the SLUMBER MODE M13 (i.e., a primitive containing a pattern indicating the instruction) is issued from the HDD 10 to the host 20, the SATA interface control circuit 22 of the host 20 returns a response indicating that the shift to the SLUMBER MODE M13 is impossible. Thus, when the host 20 does not support the SATA power saving mode, if the HDD 10 issues, to the host 20, an instruction to shift to the SATA power saving mode, the host 20 always returns a response indicating that the shift to the SATA power saving mode is impossible. Thus, control of the SATA power saving mode in the host 20 by the HDD 10 fails. In other words, if the HDD 10 is connected, via the SATA bus 30, to a host 20 that does not support the SATA power saving mode, it is useless for the HDD 10 to perform SATA power saving mode control.

Because of the above, in the embodiment, if the host 20 returns a response indicating that a shift to a designated SATA power saving mode is impossible, i.e., if SATA power saving mode control has failed, the CPU 130 of the HDD 10 sets the flag F stored in the flag storage area 120a in the buffer RAM 120 (steps S9 and S10). If SATA power saving mode control becomes necessary on another occasion, the CPU 130 refers to the state of the flag F to determine whether SATA power saving is possible (steps S5 and S6). If the flag F is set, the CPU 130 determines that SATA power saving is impossible, and does not perform SATA power saving mode control (steps S7 and S8). As a result, when the SATA interface control circuit 22 of the host 20 does not support the SATA power saving mode, therefore SATA power saving mode control is useless, this useless control is prevented from being executed, thereby stabilizing the operation of the SATA bus 30.

When both the HDD 10 and host 20 support the SATA power saving mode, SATA power saving mode control can be executed under the control of the host 20. However, in the HDD 10, a shift to the ATA power saving mode is autonomously performed regardless of a command, from the host 20, related to ATA power saving. Accordingly, to set a SATA power saving mode suitable for the current ATA power saving mode of the HDD 10, it is more appropriate to control the SATA power saving mode of the SATA bus 30 under the control of the HDD 10 in synchronism with the ATA power saving mode of the HDD 10, than to perform such control under the control of the host 20.

The above-described embodiment is directed to a system equipped with an HDD (magnetic disk drive). However, the present invention is also applicable to a system equipped with another type of disk drive, such as an optical disk drive, magneto-optical disk drive, etc. It is sufficient if the disk drive has a SATA interface. The present invention is further applicable to a system equipped with an electronic device other than disk drives, if only the electronic device has a SATA interface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device with a serial ATA interface connectable to a host via a serial ATA bus, comprising:
   a reporting module configured
   (a) to receive a command which designates a portion of the electronic device in first power saving mode, the command being output from the host;
   (b) to set the electronic device in the first power saving mode by executing the received command; and
   (c) to report completion of execution of the received command to the host; and
   a control module configured to control setting of second power saving mode for the serial ATA interface which relates to the first power saving mode based on a relation between the first power saving mode and the second power saving mode after the reporting.

2. The electronic device of claim 1, further comprising a disk drive.

3. The electronic device of claim 1, wherein:
   the command is a sleep command, a standby command or an idle command which are stipulated in ATA interface standards; and
   the second power saving mode is a slumber mode or a partial mode.

4. The electronic device of claim 1, further comprising:
   a detection module configured to detect, based on the control of the control module, that the host does not support a power saving function of the serial ATA interface; and
   a storing device configured to store flag information indicating the detection result, and
   wherein the control module is configured
   (a) to refer to the flag information before the control; and
   (b) to inhibit the control if the flag information indicates that the host does not support the power saving function of the serial ATA interface.

5. The electronic device of claim 1, further comprising:
   a timing module configured to detect a predetermined time, the timing module being configured to be started when the serial ATA interface is shifted to an idle mode or a partial mode, the partial mode being one of power saving modes; and
   a shifting module configured to shift the serial ATA interface from the idle mode or the partial mode to the partial mode or a slumber mode if a command has not been received during the detection of the predetermined time.

6. An information apparatus comprising:
   the electronic device of claim 1;
   a host configured to use the electronic device; and
   a serial ATA bus configured to connect the electronic device and the host.

7. The information apparatus of claim 6, wherein:
   the command is a sleep command, a standby command or an idle command which are stipulated in ATA interface standards; and
   the second power saving mode is a slumber mode or a partial mode.

8. A controller comprising:
   a reporting module configured
   (a) to receive a command which designates a portion of an electronic device with a serial ATA interface in first power saving mode, the electronic device being connectable to a host via a serial ATA bus, the command being output from the host;
   (b) to set the electronic device in the first power saving mode by executing the received command; and
   (c) to report completion of execution of the received command to the host; and a control module configured to control setting of second power saving mode for the serial ATA interface which relates to the first power saving mode based on a relation between the first power saving mode and the second power saving mode after the reporting.

9. The controller of claim 8, wherein:

the command is a sleep command, a standby command or an idle command which are stipulated in ATA interface standards; and the second power saving mode is a slumber mode or a partial mode.

10. A method for saving power in an electronic device with a serial ATA interface connectable to a host via a serial ATA bus, comprising:

receiving a command which designates a portion of the electronic device in first power saving mode, the command being output from the host;

setting the electronic device in the first power saving mode by executing the received command;

reporting completion of execution of the received command to the host; and setting second power saving mode for the serial ATA interface which relates to the first power saving mode based on a relation between the first power saving mode and the second power saving mode after the reporting.

11. The method of claim 10, wherein:

the command is a sleep command, a standby command or an idle command which are stipulated in ATA interface standards; and the second power saving mode is a slumber mode or a partial mode.

* * * * *